…

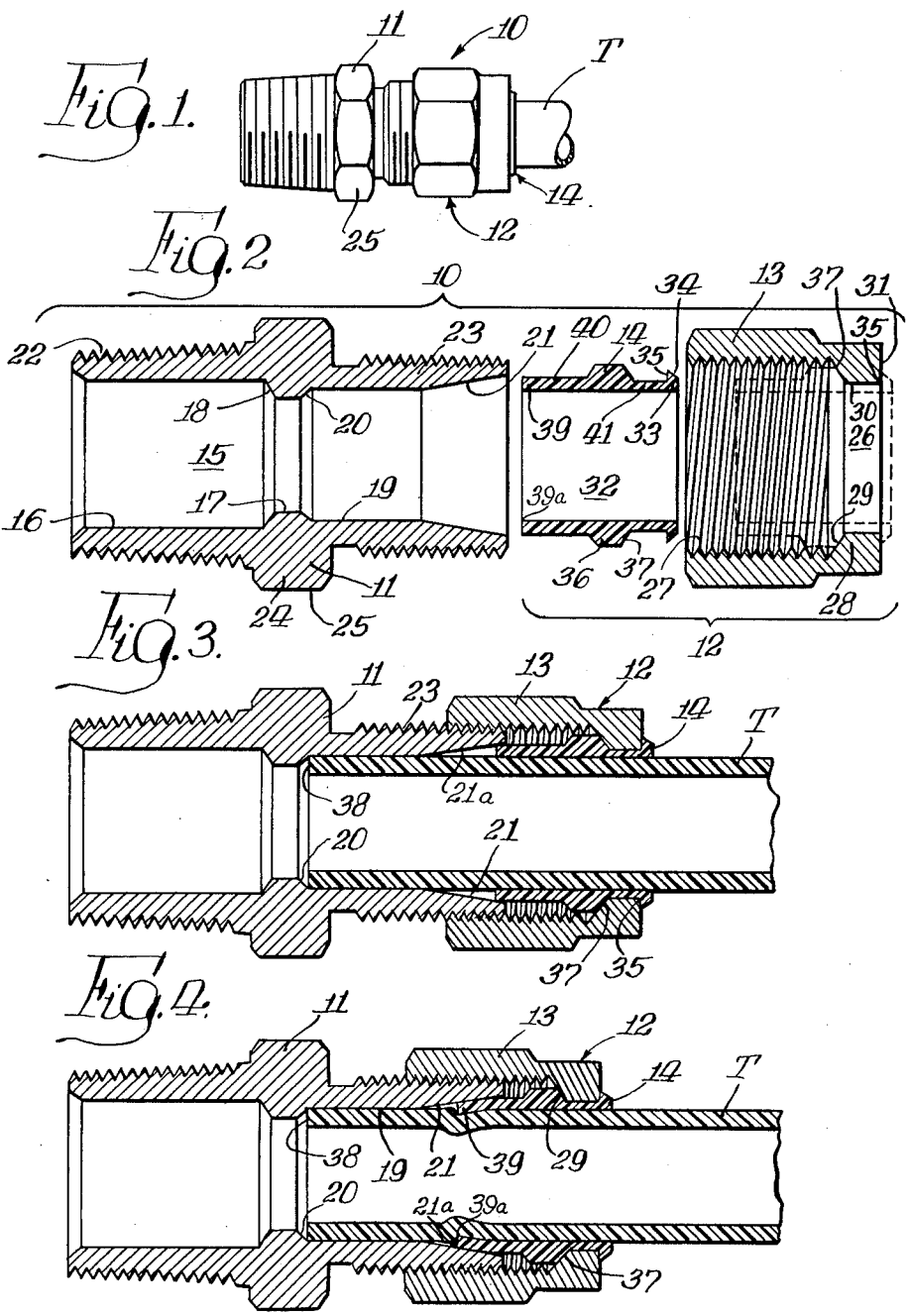

United States Patent Office 3,219,367
Patented Nov. 23, 1965

3,219,367
TUBE CONNECTOR WITH PERMANENTLY ASSEMBLED SLEEVE AND NUT ELEMENTS
George E. Franck, Morton Grove, Ill., assignor to Imperial-Eastman Corporation, a corporation of Illinois
Continuation of application Ser. No. 64,441, Oct. 24, 1960. This application Oct. 23, 1964, Ser. No. 406,959
2 Claims. (Cl. 285—238)

This application is a continuation of application Serial No. 64,441, filed October 24, 1960, and now abandoned.

This invention relates to tube fittings and in particular to tube fittings for use with soft tubing such as plastic tubing.

In fittings for use with plastic tubing, a desideratum is the effective minimizing of the number of parts of the fitting. Conventionally, such fittings for use with plastic tubing are provided as two-piece fittings which are threadedly associated in the make-up of the fitting. Such fittings have the disadvantage of tending to twist the tubing during the threaded make-up of the fitting. Where a somewhat harder tubing is to be connected with the fitting, a substantial increase in the torque necessary to make up the fitting is required.

To avoid this problem, resort has been had to providing a tripartite fitting which, while having an undesirably large number of separate parts, permits a movable association of a portion of the fitting with the tubing, thereby substantially reducing the tendency to twist the tubing during make-up.

The present invention comprehends a new and improved fitting utilizing only two effectively separate parts while yet providing a movable tube engaging portion effectively precluding the twisting of the tubing during make-up. Thus, a principal object of the present invention is to provide a new and improved fitting for use with soft tubing.

Another object of the invention is to provide such a fitting comprising only two effectively separate parts, one of which parts includes two relatively movable portions.

A further object of the invention is to provide such a fitting wherein a nut and sleeve portion are movably connected to define one part of the fitting.

Still another object of the invention is to provide such a fitting wherein the sleeve is connected to the nut by a new and improved connecting means.

Other features and advantages of the invention will be apparent from the following description taken in connection with the accompanying drawing wherein:

FIGURE 1 is an elevation of a fitting embodying the invention with a tube end portion connected thereto;

FIGURE 2 is an enlarged exploded diametric section thereof, with the sleeve also shown in dotted lines in assembled association with the nut;

FIGURE 3 is a diametric section thereof illustrating a first step in the make-up of the fitting; and FIGURE 4 is a diametric section similar to that of FIGURE 3 but illustrating a made-up fitting.

In the exemplary embodiment of the invention as disclosed in the drawing, a fitting generally designated 10 is shown to comprise a bipartite fitting including a body 11 and a tube-engaging piece generally designated 12 and including a nut 13 and a sleeve 14 movably associated therewith.

More specifically, body 11 may comprise a molded tubular member provided with a through bore 15 including an inner cylindrical portion 16, a reduced diameter, cylindrical mid-portion 17, a frusto-conical outwardly narrowing shoulder 18 between portions 16 and 17, an enlarged diameter cylindrical portion 19, an outwardly enlarging frusto-conical shoulder 20 between portions 17 and 19, and an outer frusto-conical outwardly enlarging outer end portion 21. The inner end 22 of the body is exteriorly threaded for association with a complementary female threaded element (not shown) to which the tube T is to be connected. The outer end 23 of the body is exteriorly threaded and is spaced from inner end 22 by an annular embossment 24 defining a plurality of flat wrench engaging surfaces 25.

Nut 13 of tube-engaging piece 12 comprises a tubular member having a through bore 26 defined at its inner end by a threaded portion 27. At the outer end, the nut is provided with an inturned flange 28 defined by an outwardly converging frusto-conical surface 29, a cylindrical surface 30, and a radial, planar outer end surface 31.

Sleeve 14 comprises a tubular plastic member having a bore 32 extending axially therethrough. The sleeve is radially enlarged at its outer end to define a boss 33 provided with a frusto-conical, outwardly narrowing guide surface 34 and an inner, radial shoulder 35. Intermediate its opposite ends, the sleeve is radially enlarged to define an annular boss 36 having an outer, frusto-conical outwardly narrowing surface 37 having an angularity corresponding to the angularity of nut surface 29. The spacing between shoulder 35 and frusto-conical surface 37 is preferably substantially equal to the spacing between nut flange surfaces 29 and 31, and the outer diameter of the sleeve between shoulder 35 and surface 37 is preferably substantially equal to the diameter of flange surface 30.

As briefly discussed above, the tube-engaging piece 12 comprises the assembled nut 13 and sleeve 14. To effect the assembly of the sleeve in the nut, the sleeve is moved through the nut bore portion 27 with the outer end portion 33 of the sleeve foremost. The angularity of frusto-conical surface 34 of the sleeve end 33 is preferably less than the angularity of the nut flange surface 29 so that when the sleeve outer end 33 is moved outwardly through the nut bore 27 to engage the surface 34 with the nut surface 29, a radially inward constriction of the sleeve inner end is effected, permitting the sleeve end 33 to slide along the nut flange surface 30 until shoulder 35 of the sleeve end 33 is disposed in the plane of the nut flange surface 31 whereupon the sleeve end 33 snaps radially outwardly to the dotted position of FIGURE 2. In this position of the sleeve, the sleeve surface 37 facially engages the nut flange surface 29 which, in conjunction with the facial engagement of the sleeve surface 35 with the nut flange surface 31, locks the sleeve against axial movement in the nut. As best seen in FIGURE 2 of the drawing, the radial dimension of the sleeve surface 35 is relatively large with the inner diameter of the surface 35 being only slightly less than the outer diameter of the inner portion 40 of the sleeve and with the outer diameter of the surface 35 substantially larger than the outer diameter 40 of the sleeve, whereby the area of surface 35 is approximately equal to the radial cross-sectional area of the sleeve portion 40. Sleeve 14 is preferably formed of a resilient material such as a plastic, and thus the constriction of the sleeve end 33 is readily effected. Further, the plastic sleeve has relatively free sliding engagement with the nut surfaces 29, 30 and 31, thereby effectively precluding transmission of substantial torques from the nut through the sleeve during make-up of the fitting.

In making up the fitting, the tube end T is inserted coaxially through sleeve 14 of the tube-engaging piece 12 to have its inner end 38 juxtaposed to surface 20 of the body. The nut 13 is threadedly advanced on body threaded portion 23, thereby carrying the sleeve 14 coaxially into body bore portion 21. As the inner end 39 of the sleeve moves against the body bore surface 21, it is radially inwardly constricted thereby into positive sealing engagement with the tube T. As shown in FIGURE 4, the inner edge 39a of sleeve end 39 has a right angular configuration in diametric section. The constriction of the sleeve end 39 causes edge 39a of the sleeve end to dig into the tube T and positively retain the tube against longitudinally outward movement thereof upon completion of the make-up of the fitting. The edge 39a deforms the tube T radially inwardly as a result of the constriction of the sleeve end, as shown in FIGURE 4. As shown, edge 39a substantially maintains its right angular digging configuration in deforming the tube and penetrates into the tube wall approximately one-half the radial thickness thereof to provide the positive sealing connection of the tube T to the body 11. As shown, the inner portion 40 is somewhat thicker than the outer portion 41 of the sleeve 14 effectively precluding buckling of the inner sleeve portion during the movement thereof into the body bore portion 21. More specifically, as shown in FIGURE 3, the inner end 39 has a radial thickness of at least substantially twice the underformed clearance between the outer surface of the tube T and the surface of body bore 21 at the location 21a thereof wherein the inner end 39 is disposed upon completion of the make-up of the fitting as shown in FIGURE 4. Further, the angularity of the nut flange surface 29, which is preferably in an angle of approximately 60° the axis of the nut, directs the tube gripping forces from the nut inwardly toward the axis of the sleeve, thereby effectively precluding radial outward buckling of the sleeve portion 40 during the make-up of the fitting. As the nut slides rotatively over the sleeve during the fitting make-up, twisting of the tube T is effectively eliminated assuring an effectively positive sealing retention of the tube end in the fitting. Further, as a result of the sliding engagement of the nut with the sleeve during the fitting make-up, substantially less torque is required, thereby further facilitating the fitting make-up.

While I have shown and described one embodiment of my invention, it is to be understood that it is capable of many modifications. Changes, therefore, in the construction and arrangement may be made without departing from the spirit and scope of the invention as defined in the appended claims.

I claim:

1. A fitting for use with soft tubing, comprising:
  a body having a bore therethrough including an axially outwardly facing, transaxially inwardly projecting shoulder at an intermediate portion thereof, and an axially outwardly enlarging, frusto-conical outer end portion;
  a nut having a bore therethrough and an inturned annular, axially outer flange having an axially inner surface portion and an axially outer planar radial surface portion, said flange being substantially rigid to maintain the diameters of said surface portions substantially constant prior to and upon completion of make-up of the fittting;
  cooperating means on said body and nut adjustably coaxially spacing said end portion of the body bore and said nut flange; and
  a tubular plastic sleeve arranged to receive a tube end coaxially therethrough having an inner end received in said outer portion of the body bore and defining an annular, axially and radially inner digging edge having a right angular configuration in diametric section, said inner end having a radial thickness of at least substantially twice the undeformed clearance between the outer surface of said tube end and said outer end portion of the body bore at the position where said inner end of the sleeve disposed upon completion of make-up of the fitting, a transaxially outwardly enlarged midportion engaging said inner surface portion of the nut flange, and a transaxially outwardly enlarged annularly continuous outer portion having a planar radial inner surface engaging said outer surface portion of the nut flange, the area of engagement of said axially outer surface of the nut flange with the inner surface of the outer enlarged portion of the sleeve being at least equal to approximately the cross-sectional area of said inner end of the sleeve, said sleeve being formed of a resilient material such as a plastic permitting a constriction thereof sufficiently to pass one of said enlarged portions through the nut flange to dispose said enlarged portions of the sleeve respectively axially inwardly and outwardly of said flange to retain the sleeve permanently in association with the nut while allowing coaxial rotation therebetween, said sleeve being forced axially inwardly by said nut flange as an incident of advance of the nut toward the body to force the sleeve inner end against the frusto-conical end portion of the body bore and thereby constrict said sleeve inner end to at least approximately one-half the radial thickness thereof into sealing, gripping engagement with said tube end extended through the nut bore and the sleeve to adjacent said shoulder of the body bore, said digging edge deforming said tube radially inwardly while substantially maintaining said right angle configuration, said sleeve returning substantially to its undeformed configuration upon disassembly of the fitting.

2. A fitting for use with soft tubing, comprising:
  a body having a bore therethrough including an axially outwardly enlarging, frusto-conical outer end portion;
  a nut having a bore therethrough and an inturned annular, axially outer flange having an axially inner surface portion, an axially outer planar radial surface portion, said flange being substantially rigid to maintain the diameters of said surface portions substantially constant prior to and upon completion of make-up of the fitting;
  cooperating threads on said body and nut adjustably coaxially spacing said end portion of the body bore and said nut flange; and
  a tubular plastic sleeve arranged to receive a tube end coaxially therethrough having an inner end received in said outer portion of the body bore and defining an annular, axially and radially inner digging edge having a right angular configuration in diametric section, said inner end having a radial thickness of at least substantially twice the undeformed clearance between the outer surface of said tube end and said outer end portion of the body bore at the position where said inner end of the sleeve is disposed upon completion of make-up of the fitting, a transaxially outwardly enlarged mid-portion slidably engaging said inner surface portion of the nut flange, and a transaxially outwardly enlarged annularly continuous outer portion having a planar radial inner surface slidably engaging said outer surface portion of the nut flange, the area of engagement of said axially outer surface of the nut flange with the inner surface of the outer enlarged portion of the sleeve being at least equal to approximately the cross-sectional area of said inner end of the sleeve, said sleeve being formed of a resilient material such as a plastic permitting a construction thereof sufficiently to pass one of said enlarged portions through the nut flange to dispose said enlarged portions of the sleeve respectively axially inwardly and outwardly of said flange to retain the sleeve permanently in association with the nut while allowing coaxial rotation therebetween, said sleeve being forced axially inwardly by said nut flange as an incident of threaded advance of the nut toward the body to force the sleeve inner end against the frusto-conical end portion of the body bore and thereby constrict said sleeve inner end to at least approximately one-half the radial thickness thereof into sealing, gripping engagement with said tube end extended through the nut bore and the sleeve, said digging edge deforming said tube radially inwardly while substantially maintaining said right angle configuration, said sleeve returning substantially to its undeformed configuration upon disassembly of the fitting.

References Cited by the Examiner

UNITED STATES PATENTS

| | | | |
|---|---|---|---|
| 1,920,512 | 8/1933 | Lamont | 285—342 X |
| 2,365,747 | 12/1944 | Cowles | 285—341 X |
| 2,497,273 | 2/1950 | Richardson | 285—382.7 X |
| 2,544,108 | 3/1951 | Richardson | 285—116 X |
| 2,545,930 | 3/1951 | Richardson | 285—382.7 X |
| 2,547,889 | 4/1951 | Richardson | 285—331 |
| 2,552,077 | 5/1951 | Williams et al. | 285—249 |
| 2,821,567 | 1/1958 | Bergan | 285—249 |

FOREIGN PATENTS

| | | |
|---|---|---|
| 44,780 | 1/1935 | France. |
| 323,651 | 1/1930 | Great Britain. |

CARL W. TOMLIN, *Primary Examiner.*

THOMAS F. CALLAGHAN, *Examiner.*